United States Patent
He et al.

(10) Patent No.: US 7,364,074 B2
(45) Date of Patent: Apr. 29, 2008

(54) METHOD OF AUTHENTICATING PRODUCTS USING ANALOG AND DIGITAL IDENTIFIERS

(75) Inventors: Duanfeng He, South Setauket, NY (US); William J. Callahan, Brookhaven, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 299 days.

(21) Appl. No.: 11/039,682

(22) Filed: Jan. 19, 2005

(65) Prior Publication Data
US 2006/0091208 A1    May 4, 2006

Related U.S. Application Data

(63) Continuation-in-part of application No. 10/977,597, filed on Oct. 29, 2004.

(51) Int. Cl.
*G06F 19/00* (2006.01)
(52) U.S. Cl. ............ 235/385; 235/462.01; 235/462.09; 235/462.34; 235/468
(58) Field of Classification Search .............. 235/385, 235/462.01, 462.09, 462.24, 462.34, 454, 235/468
See application file for complete search history.

(56) References Cited

U.S. PATENT DOCUMENTS

| | | | |
|---|---|---|---|
| 6,226,619 B1 * | 5/2001 | Halperin et al. ............... 705/1 |
| 6,343,695 B1 * | 2/2002 | Petrick et al. ............... 206/534 |
| 6,373,965 B1 * | 4/2002 | Liang ......................... 382/112 |
| 6,592,034 B1 * | 7/2003 | Millard et al. .............. 235/449 |
| 6,782,115 B2 * | 8/2004 | Decker et al. .............. 382/100 |
| 2002/0024215 A1 * | 2/2002 | Wong ......................... 283/72 |
| 2002/0170966 A1 * | 11/2002 | Hannigan et al. ...... 235/462.01 |

\* cited by examiner

*Primary Examiner*—Ahshik Kim
(74) *Attorney, Agent, or Firm*—Tarolli, Sundheim, Covell & Tummino LLP

(57) ABSTRACT

A method of identifying or authenticating a product by providing an analog identification indicium including a randomized pattern of identification features on a first part of the product wherein one or more attributes of the randomized pattern of identification features correspond to an item identifier. A digital identification record is provided on a second part of the product including an encoded digital version of the item identifier, the first and second parts being separable when the product is used. The randomized pattern of identification features of the analog identification indicium is read and decoded to generate an item identifier and the digital identification record is read and decoded to generate an item identifier. The product is deemed authentic if the item identifier from the analog identification indicium substantially matches the item identifier from the digital identification record.

24 Claims, 4 Drawing Sheets

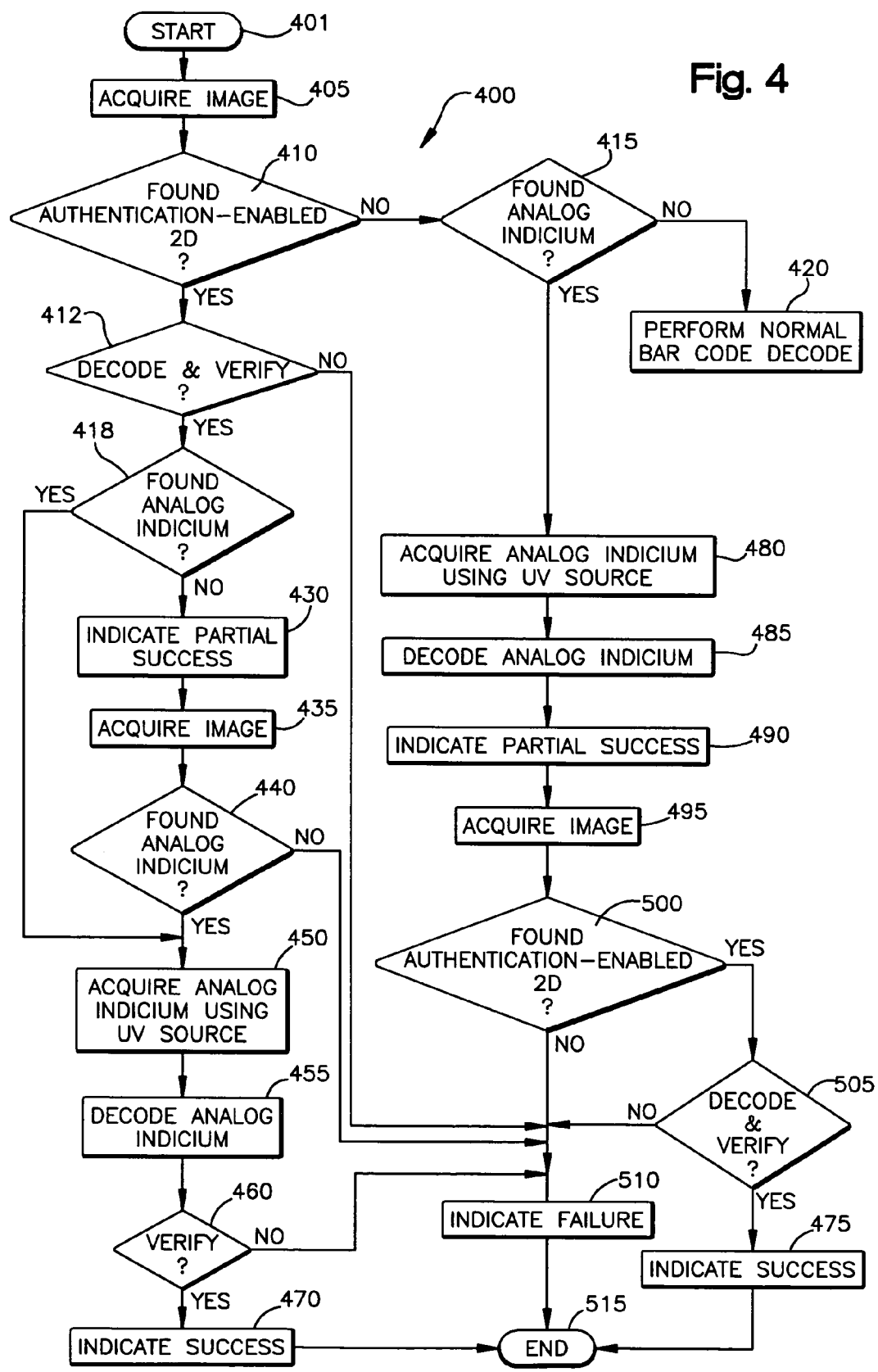

METHOD OF AUTHENTICATING PRODUCTS USING ANALOG AND DIGITAL IDENTIFIERS

CROSS-REFERENCE TO RELATED APPLICATION

The present invention is a continuation-in-part of U.S. application Ser. No. 10/977,597, filed on Oct. 29, 2004 and entitled "Analog and Digital Indicia Authentication." The '597 application is incorporated herein in its entirety by reference.

FIELD OF THE INVENTION

The present invention relates to a system and method of authenticating a product using a combination of analog and digital identifiers including an analog identification indicium and a corresponding digital identification record and, more specifically, to a system and method of authenticating a product wherein the analog identification indicium and the digital identification record are affixed to separable parts of the product's container and/or packaging.

BACKGROUND OF THE INVENTION

There is an increasing concern over counterfeit products including software, music CDs, and over-the-counter and prescription drugs entering the U.S. market. Counterfeit products not only depress profits of legitimate manufactures, but consumers who unknowingly purchase counterfeit products are being misled. Because of health issues involving counterfeit drugs, this is a paramount concern of drug manufacturers and governmental agencies. The concern is exacerbated because of the ready availability of lower cost prescription drugs from Internet pharmacies and drug stores with undisclosed sources for the product they provide.

Because of governmental regulations and/or to prevent unauthorized tampering, many prescription and over-the-counter drugs are packaged in containers using tamper-resistant seals. The consumer purchasing a drug product must break or destroy the tamper-resistant seal in order to open the container and access the product. While such tamper-resistant seals effectively thwart tampering, sophisticated counterfeit drug manufacturers may manufacture containers that include a tamper-resistant seal. Thus, tamper-resistant seals do not adequately address the issue of counterfeit drugs.

Many other anti-counterfeit measures have been developed for use with other products that been prime targets for counterfeiters such as checks, CDs and DVDs. These anti-counterfeit measures attempt to prevent a counterfeit manufacturer from easily reproducing labels that bear anti-counterfeit indicium. For example, companies such as Microsoft Corporation use holograms on the packages of their software to indicate authenticity. Escher Group of Cambridge, Mass. has developed a FiberFingerprint™ technology that can identify a piece of paper by its natural and unique fiber patterns. This enables the capability to identify a piece of paper in a way similar to identifying people through fingerprints. Tracer Technologies of Syosset, N.Y. has developed a fluorescent micro-fiber detection technology for security. The micro-fibers are randomly embedded in a plastic material which are only revealed upon illumination by UV light. AMCO of Farmingdale, N.Y. has developed visible as well as fluorescent tags that can be embedded in plastics. Other pigments that can be imbedded in an anti-counterfeit label or in a product have the capability of changing color when viewed at different angles. Such a color-changing pigment is also present in certain denominations of newly printed U.S. currency.

These anti-counterfeiting technologies make it difficult to reproduce the anti-counterfeit label component using copying or scanning techniques. However, more sophisticated counterfeiters have been known to make the investment necessary to duplicate these anti-counterfeit measures. For example, the holographic labels such as those used by Microsoft Corporation are known to have been successfully counterfeited.

There is a need to provide an effective identification and authentication procedure to insure that a purchased product is authentic, beyond presently used authentication and anti-counterfeiting methods. Further, there is a need to accomplish the foregoing objectives using readily available technology and equipment.

SUMMARY OF THE INVENTION

The present invention features a method of identifying or authenticating a product. The steps of the method include:

a) providing an analog identification indicium comprising a randomized pattern of identification features on a first part of the product, one or more attributes of the randomized pattern of identification features corresponding to an item identifier;

b) providing a digital identification record on a second part of the product, the digital identification record including an encoded digital version of the item identifier, the first and second parts being separable when the product is used;

c) reading the randomized pattern of identification features of the analog identification indicium and decoding an item identifier;

d) reading the digital identification record and decoding an item identifier; and e) determining authenticity of the product by comparing the item identifier determined from the analog identification indicium to the item identifier determined from the digital identification record.

The analog identification indicium may preferably be an analog product identification signature in the form of a random pattern of identification features embedded in a area the product label, product container or product packaging. The item identifier is derived by imaging the random pattern of identification features in the predetermined identification area of the product label, product packaging or product label and decoding the imaged pattern to determine the product identifier. The identification features may be color shifting fibers embedded in the material used to fabricate the product label, container or packaging.

The digital identification record may comprise an authentication-enabled digital identifier in the form of a two dimensional (2D) bar code imprinted on a tamper-resistant seal of the product container. The 2D bar code may include a payload of product-related information in one portion of the bar code, a digital signature in another portion of the bar code and the digital identification record in a third portion of the bar code. When the 2D bar code is decoded, the digital signature is used to authenticate the payload and digital identification record. The digital identification record, when decoded, is used to authenticate the product by generating an item identifier which is then compared to an item identifier decoded from the analog authentication indicium. The 2D bar code may be imprinted on a tamper-resistant seal of the product, the seal being destroyed upon a user opening the product.

In addition to 2D bar codes, other types of suitable authentication-enabled digital identifiers would include an RFID (radio frequency identification) tag, a memory button, or a magnetic memory strip affixed to the product container or product packaging.

Advantageously, a modified bar code reader may be used to decode both the analog identification indicium and the digital identification record.

The present invention also features a system for authenticating a product. The system includes:

a) the product including:
1) an analog identification indicium comprising a random pattern of identification features affixed to a first part of the product, the analog identification indicium representing an item identifier; and
2) a digital identification record affixed to a second part of the product, the digital identification including an encoded version of the item identifier, the first and second parts being separable when the product is used; and b) an imaging device including an imaging system for generating an image of the analog identification indicium and the digital identification record;

c) the imaging device further including circuitry for:
1) analyzing the image of the analog identification indicium and decoding an item identifier;
2) analyzing the image of the digital identification record and decoding an item identifier; and
3) comparing the item identifier determined from the analog identification indicium to the item identifier determined from the digital identification record to authenticate the product.

These and other objects, advantages, and features of the exemplary embodiment of the invention are described in detail in conjunction with the accompanying drawings.

BRIEF DESCRIPTION OF THE DRAWINGS

FIG. 4 is a flow chart of a method used by the reader to process analog and digital identification indicia to authenticate the product of FIG. 1.

DETAILED DESCRIPTION

Figure 1:
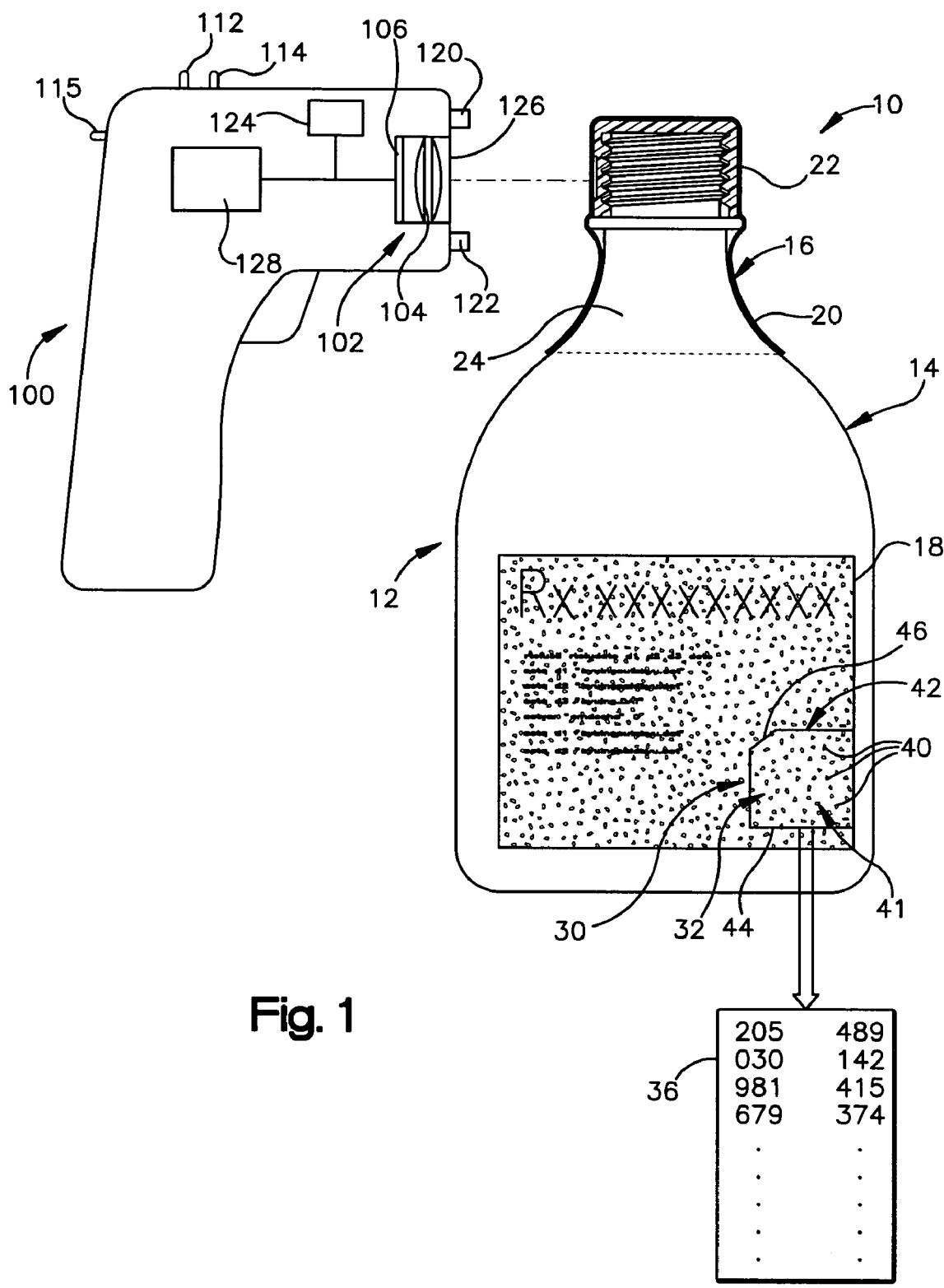
FIG. 1 is a schematic representation of a product authentication/identification system including a reader capable of imaging and decoding both analog and digital identification indicia and a product including an analog identification indicium embedded in a container label of the product and a digital identification indicium included in a 2D bar code imprinted on a tamper-resistant seal of the product.
Figure 2:
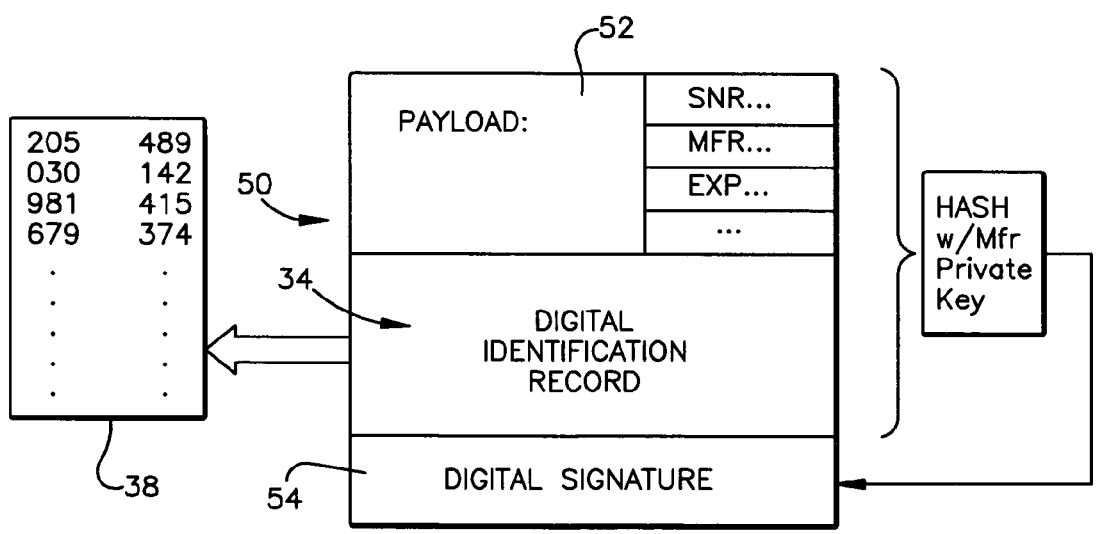
FIG. 2 is a schematic illustration of information encoded in the 2D bar code of FIG. 1 including the digital identification indicium.

One preferred embodiment of the identification or authentication system of the present invention is shown generally at 10 in FIGS. 1 and 2. The system 10 provides a straightforward way of authenticating a product 12 using a two component authentication identifier 30, the two components being attached to separable parts of the product 12. The system also includes a reader device 100 adapted to read and decode both components of the authentication identifier 30.

Figure 1A:
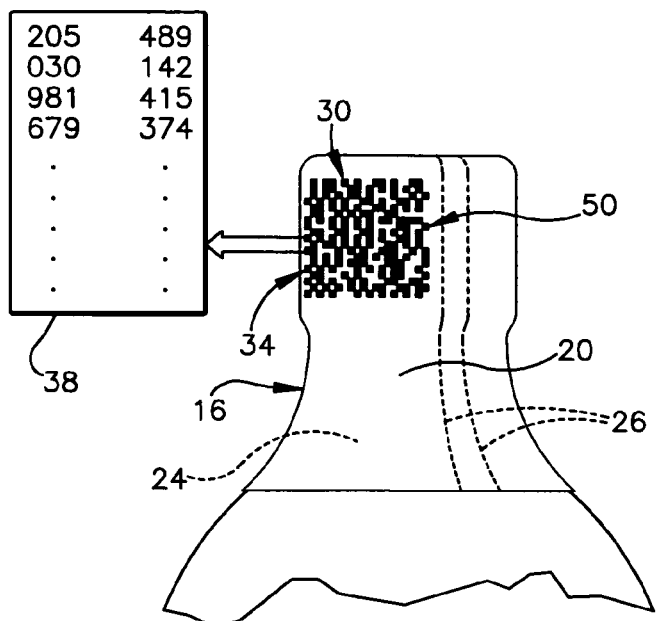
FIG. 1A is a schematic elevation view of the wrapped seal of FIG. 1.

The product 12 includes a container 14 that holds, for example, prescription medication in the form of tablets, capsules or liquid. The product container 14 includes a tamper-resistant seal 16 and a product label 18. As shown in FIGS. 1 and 1A, the seal 16 may be a plastic wrap 20 that tightly overlies a cap or top 22 of the container 14 and a shoulder portion 24 of the container below the cap 22. Typically, the seal wrap 20 includes one or more vertical lines of weakness 26 that allow a consumer to more easily remove the wrap 20 from container 14.

The product 12 includes the authentication identifier 30 which has two components: an analog identification indicium 32 and a digital identifier or indicium such as a digital identifier record 34. The analog identification indicium 32 and the digital identification record 34 are applied or affixed to separable parts of the product 12. The analog identification indicium 32 is embodied in a random pattern 41 of identification features 40 within an area of interest 42. The digital identification record 34 is embodied in a digital pattern of a portion of a 2D bar code 50. The analog identification indicium 32, when decoded, generates an item identifier 36. Similarly, the digital identification record 34, when decoded, generates an item identifier 38.

If a comparison of the patterns comprising the item identifiers 36, 38 indicates that they match, that is, they are similar within predetermine tolerances, the product 12 is deemed authentic. During manufacture of the product 12, the item identifier 36 generated from the analog identification indicium 32 is used to encode the digital identification record 34, therefore, the item identifiers 36, 38 should be identical.

However, when subsequently authenticating the product 12 in the field, the reading and decoding of the analog identification indicium 32 is prone to error because many variables that may affect the quality of the imaging and, thus, the decoded item identifier 36 may be slightly influenced by the angle and distance of the reader device 100 from the pattern 41, the illumination level, contaminants on or damage of the area of interest 42 of the product 12, etc. On the other hand, because of error-correction techniques generally built into the 2D bar code 50, the reader device 100 generally can accurately decode the bar code 50. Thus, even if the product 12 is authentic, the item identifiers 36, 38 are unlikely to match exactly. Rather, the geometrical patterns represented by the item identifiers 36, 38 are compared and if they are within predetermined tolerance limits, the product 12 is deemed authentic.

More specifically, the analog identification indicium 32, when decoded, corresponds to or generates a sequence of numerical values referred to as the item identifier or signature 36. The numerical values of the item identifier 36 may, for example, correspond to Cartesian (x & y) coordinates of some or all of the identification features 40 within the area of interest 42 and/or reflected or emitted light intensity values of some or all of the imaged features 40 and/or color values of some or all of the imaged features 40 and/or other attributes of the random pattern 41. The sequence of numbers corresponding to the item identifier 36 of the analog identification indicium 32 is encoded into the digital identification record 34 of the product 12.

Advantageously, the two components of the authentication identifiers 30 are disposed on separable parts of the product 12. For example, the analog identification indicium 32 may be incorporated into the product label 18, while the digital identification record 34 may be incorporated into the tamper-resistant seal wrap 20. In this way, when the product 12 is opened for use by a purchaser, the components 32, 34 of the authentication identifier 30 are separated thereby removing the connection between the components and preventing their reuse.

Further, upon first opening of the product container 14, the digital identification record 34 incorporated in the seal wrap 20 is destroyed, preventing, for example, refilling the container 14 with counterfeit tablets, capsules or liquid and reselling the product 12.

The identification and authentication system 10 further includes the reader device 100, such as an imaging-based bar code reader or scanner capable of reading and decoding both the analog identification indicium 32 and the digital identification indicium 34. Generally, imaging-based bar code readers or scanners include an imaging system 102 that utilizes an imaging array such as a CCD array or a CMOS array having a plurality of photosensitive elements or pixels.

Light reflected or emitted from a target image, e.g., a target bar code imprinted on a product label or product packaging within a field of view of the imaging system 102, is focused through a lens 104 of the imaging system onto a pixel array 106. Output signals from the pixels of the pixel array are digitized by an analog-to-digital converter 108. Decoding circuitry 110 of the device 100 processes the digitized signals and attempts to decode the imaged target, e.g., the imaged target bar code. While the shapes and relative sizes of the analog and digital identification identifiers 32, 34 are arbitrary, it is advantageous to select relative sizes that may be successfully imaged by the optics of the same reader 100 without the need for changing magnification or zooming.

One method of determining product authenticity is to use reader device 100 to read and decode the analog identification indicium 32 and the digital identification record 34. If the two identification identifiers 32, 34 generate the same or substantially the same item identifiers 36, 38, the product 12 is determined to be authentic and a positive audio and/or visual feedback may be provided to the operator of the reader 100, e.g., illumination of a pair of green LEDs 112, 114 and/or an audible "beep" from a speaker 113 to indicate an authentic product. As noted above, because of the variability inherent in imaging in the field as well as contaminants and damage to the product 12 (e.g., scratches on the product label 18 and/or seal 20), it is likely that pattern of numbers representing the item identifiers 36, 38 will not match exactly. For example, when imaging the random pattern 41 comprising the analog identification indicium 32, one or more of the identification features 40 is "missed," that is, not successfully imaged and decoded, the resulting pattern of numbers representing the item identifier 36 will necessarily be different than the pattern of numbers representing the item identifier 38 decoded from the 2D bar code 50.

Depending on the nature of the product and the desired level of security, a substantial matching, that is, some predetermined level of matching less than 100% matching of the compared patterns comprising the item identifiers 36, 38 will be deemed sufficient to determine the product 12 is authentic.

This method of authentication has the advantage of being a "stand alone" method of authentication that can be performed in the field without the necessity of communicating with a remote database. If desired, however, information from the authentication process may be communicated to a central database to permit tracing and tracking of the product 12 through its distribution system from manufacturer to consumer. The transmission of information regarding the product 12 to a central database may also include a product serial number (encoded in a payload 52 of the 2D bar code 50), the time and place that the authentication occurred, an identification number of the reader device 100, an identification number of the user/company authorized to use the reader device 100.

Analog Identification Indicium 32

Embedded in the label 18 is the analog identification indicium 32 comprising the random identification pattern 41. The pattern 41 includes a plurality of spaced apart identification features 40 within the area or region of interest 42 of the label 18. To facilitate reading the region of interest 42, the region of interest 42 may be marked with an identification mark in the form of a border or outline 44, visible under normal ambient light, to define the region of interest 42 (FIG. 1A). Right angled portions of the border or outline 44 may advantageously be used as the coordinate axes for calculating the x & y coordinates of the features 40, the x & y coordinate values being part of the item identifier 36.

The identification features 40 preferably are embedded in the material that the label 18 is fabricated from. The features 40, for example, may be one or more types of colored particles distributed in a random pattern. Some or all of the colored particles may be color-shifting particles such that the particles respond in a predictable way under illumination of a given wavelength, for example, the features 40 may be color-shifting such that they are visible in the presence of UV or infrared light, but nearly invisible when illuminated with visible light. One color-shifting characteristic that can be used is fluorescence, which generally refers to the excitation of visible light by means of invisible illumination.

The use of color-shifting features prevents the use of photocopiers or scanners to reproduce the label 18. The use of colored features 40 advantageously allows batches of label material to be produced in a normal process of making certain film or paper-like materials wherein the features would be randomly mixed in and survive intact throughout the remaining process. One benefit of using color-shifting material is that the influence of post-production disfigurations and contaminations (such as pieces of dirt or dust), which are not normally color-shifting themselves, is reduced. Such disfigurations can be detected by comparing an image taken with UV or infrared light to one taken with visible light.

The analog identification features 40 are demarcated by the outline 44 such that, while the colored particles may be located throughout the label 28, only the demarcated area or region of interest 42 is processed by reader 100 to read the analog identification indicium 32. Alternatively, the identification pattern 41 may be printed on the label material using a conventional printing process provided that the features 40 are random and, therefore, would change from label to label such that each analog identification indicium 32 would generate a unique product identifier 36.

The analog identification indicium 32 preferably includes an orientation feature 46 to indicate to the reader 100 how the analog identification features 40 should be parsed in order to match the reading orientation used for generating the digital identification record 34 and to successfully read and decode the analog identification indicium 32. Alternately, the analog identification indicium 32 may be of a type that does not require an orientation feature for successful reading and decoding. An example of such an analog identification indicium comprising a random pattern of identification features in the form of particles imbedded in a tamper-resistant seal or cap of a container is disclosed in U.S. application Ser. No. 10/974,644, filed on Oct. 27, 2004 and entitled "Method of Identifying and Authenticating Products Using an Identification Pattern and Bar Code Reader." The '644 application is assigned to the assignee of the present invention and is incorporated herein in its entirety by reference.

Any other randomly generated pattern that is difficult to reproduce using conventional methods may be used as the analog identification indicium 32. The random pattern of features 40 can be generated such that the features produce a unique identifier or signature for each indicium that would rarely, if ever, be reproduced in a like indicium. The randomness increases the likelihood of detection of strictly duplicated analog identification features. The randomness can be derived from a variety of factors, such as the location, size, or color of the features and if the features are long, such as fibers, the orientation of the fibers as well can be used to derive randomness.

The indicia reader 100 reads the analog identification indicium 32 and using a mathematical algorithm and/or decision rules determines the item identifier 36, that is, a numerical representation of some quality of the analog identification feature. For example, the identifier 36 may be a collection of data describing the identifiable features in the analog identification feature, such as the x-y coordinates of all or a predetermined number of features 40.

Digital Identification Record 34

In the manufacturing of the product label 18, a unique analog identification indicium 32 in the form of a random identification pattern 41 in a region of interest 42 is generated as described above. The analog identification indicium 32, when decoded by the reader 100, generates or is transformed into the unique item identifier 36. During the manufacturing process, the item identifier 36 is then encoded to generate the digital identification record 34 which attached to or imprinted on the product 12 for subsequent authentication. The digital identification record 34 preferably is encoded in a portion of the 2D bar code 50, such as a DataMatrix bar code.

The item identifier 36 may also be stored in a memory 124 of the reader 100. The reader memory 124 may include a file of authentic item identifiers. A record of recently read signatures, or their representations, such as hashes, may be advantageously stored for comparison to the signature currently being processed to detect duplication of a random pattern among labels in the same batch of product.

FIG. 2 is a schematic representation of the 2D bar code 50. The bar code 50 is digital, that is, the presence or absence of a dark area or cell is representative of a zero or one. The bar code 50 includes three encoded fields or parts: the payload 52, the digital identification record 34 which includes the encoded item identifier 38, and a digital signature 54. The data encoded in the bar code 50 is generally not encrypted, but advantageously uses error-correction to protect the reading integrity of the information it carries. Identifiers usually identify each individual field or groups of fields according to given industrial standards.

The payload 52 encodes the manufacturer's identifying and specifying information and typically includes some or all of the following information: UPC/EAN number, manufacturer, part number, lot number, serial number, and expiration date. This portion of the bar code 50 can be read and processed by standard bar code scanners or readers in those situations where authentication is deemed unnecessary.

The digital identification record 34 is tagged with an identifier similar to those used for the payload information. Encoding the digital signature 54 in the bar code 50 utilizes a technology that is widely available in e-commerce and in almost every web browser. The National Institute of Standards and Technology (www.nist.gov) maintains a standard version, which is available at no cost. As shown in FIG. 2, the digital signature is a one-way hash of the message to which the signature is attached. In this case, the message is the information from the previous two subsections (payload 52 and digital identification record 34). The field identifiers themselves could be included as part of the message. The presence of the digital signature 54 vouches for the authenticity of the information that is used to create the signature. The signer possesses a unique number for generating the one-way hash, which is generally referred to as the secret or private key. A published related number, that is, a public key is used to verify that the digital signature 54 matches the message.

Indicia Reader 100

The indicia reader shown in FIG. 1 is a hand-held imaging-based scanner or reader. However the invention can be applied to stationary readers and laser scanners as well. Utilizing its imaging system 102 and bar code decoding circuitry 110, the reader 100 may be used both to image and decode the 2D bar code 50 imprinted on a label 18 to obtain certain information and for inventory control purposes and to authenticate the product 12 by imaging and decoding the analog identification indicium 32 and comparing the item identifier 36 derived from the indicium 32 with the item identifier 38 embedded in the digital identification record 34 of the 2D bar code 50. The reader 100 images the 2D bar code 50 and decodes the digital identification record 34 to obtain the item identifier 38.

For the decoding of the analog identification pattern 41, the reader 100 includes additional pattern decoding circuitry 116, embodied either in software or hardware, such that when the label 18 area of interest 42 is imaged by the reader 100, the pattern decoding circuitry 116 analyzes the captured image, locates and identifies the analog identification indicium 32 by the shape of its outline 44, identifies the region of interest 42 and the identification features or particles 40 within it, ascertains the identification pattern 41 and determines the item identifier 36 for the product 12. The item identifiers 36, 38 are compared by comparison circuitry 118 of the reader 100 to decide if the identifiers 36, 38 are similar enough to conclude the product 12 is authentic.

Since it is desired that the reader 100 be able to image and decode both an identification pattern 41 that includes particles 40 that color shift under UV illumination and a 2D bar code 50, it is necessary that the reader provide both visible illumination and illumination in the ultraviolet (UV) range. Additional opto-electrical components may also be desired to form an aiming pattern corresponding to a field of view of the imaging assembly 102. The visible illumination is preferably provided in the form of an array of visible LEDs 120 and the UV illumination is preferably provided in the form of an array of UV LEDs and/or one or more UV lasers 122. Providing a UV laser 122 instead of or in addition to UV LEDs increases the intensity of the excitation UV light directed at the fluorescent particles 40. This, in turn, causes the emitted fluorescent light to be of greater intensity and, therefore, more likely to produce a decodable image.

Figure 3:
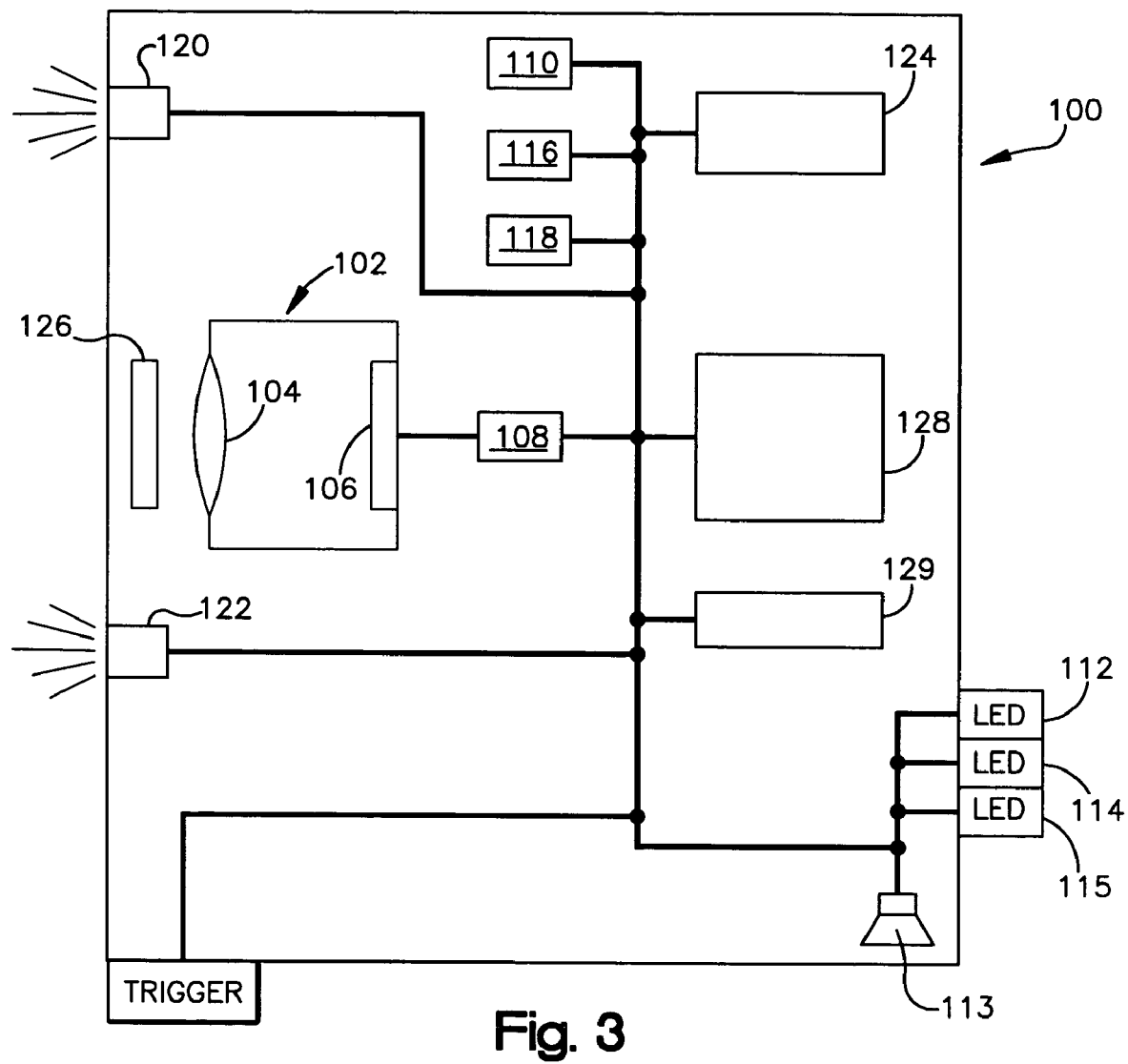
FIG. 3 is a schematic illustration of a reader capable of imaging and decoding both analog and digital identification indicia.

If the analog identification feature includes color-shifting fibers, a specialized imaging system 102 such as that shown in FIG. 3 is required to detect the color-shifting fibers. The imaging system 102 includes the lens 104 and the sensor 106 (such as a CCD or CMOS 2-D array sensor), a narrow band block filter 126 that is in the reflected light path of the lens 104, positioned either in front of or behind the lens, one or more visible LEDs 120, one or more UV LEDs and/or UV laser 122, a micro-processor 128, the on board memory 124, which may contain a database of public keys, and interface and support circuits 129. The interface and support circuits 129 may have wired and/or wireless communications means to a host computer or a network. It may also contain an onboard battery (not shown), and/or connections for an external power supply (not shown).

The narrow band block filter 126 has a pass band that is chosen to match that of the fluorescent light emitted by the identification features 40. In addition, it also matches that of the visible LEDs 120. This is possible because there are different fluorescent materials that fluorescence in different wavelengths. And likewise, there are different LEDs that emit light in different wavelengths. By choosing a suitable fluorescent material and a type of LED that have common wavelengths, the filter 126 can be constructed with a pass band that can allow both the light of the LEDs 120 and the fluorescence of the features 40 to pass through. Having a narrow band filter has the advantage that it can block out the majority of ambient light. Because the emitted fluorescent light is often weak, ambient light, if not blocked, could easily overwhelm the fluorescent light. Alternatively, the reader 100 could be constructed to work in contact mode, that is, a forwardly facing outer bezel of the imaging system 102 is positioned so as to touch the product 12 in order to read the identification pattern 41 or the 2D bar code 50. In the contact mode, the reader body functions to block out ambient light.

To process the authentication-enabled analog and digital identifiers 32, 34, the device 100 includes decoding and comparison software 110, 116, 118 that follows the method 400 outlined in FIG. 4. The device 100 can operate in one of several modes, allowing for varied degree of functionality depending on the capabilities of the reader 100 and its level of connectivity. The level of connectivity may be batch, where the device 100 works without a connection to a PC and either performs only the authentication task and provides audio/visual feedback for success or failure, or stores the decoded bar code results in its on-board memory 124 for downloading at a later time. Alternately, the device 100 may be connected to a computer or a wide-area-network. In this way, the decoded results can be instantly transferred, for example, for processing on a linked computer and used for tracking and tracing applications, that is, tracking and tracing the product 12 through its distribution system.

Method of Authentication

Referring now to FIG. 4, a method of authentication is shown generally at 400. At step 405, upon actuation of the reader 100, an image is acquired of the product 12 using the visible illumination source 120. At step 410, the acquired image is analyzed to determine if the authentication-enabled 2D bar code 50 is in the captured image. An authentication-enabled bar code is one that includes a field including the digital identification record 34 and a field including the digital signature 54. If not, the image is analyzed at step 415 to check for the presence of the analog identification indicium 32 indicated by the outline 44.

If neither an authentication enabled bar code 50 nor the analog identification indicium 32 is detected, but the image does include a standard bar code, the image is decoded in the standard fashion at step 420. This branch of the software allows the device 100 to process a regular bar code that is not authentication-enabled.

If the analog identification indicium 32 is found in the image at step 415, the analog identification indicium 32 is acquired again in step 480. The step of reacquisition as indicated in step 480, is needed if the imaging of the identification features 40 of the analog identification indicium 32 requires specialized light, such as UV. The analog identification pattern 41 within the outline 44 is processed in step 485 to decode the product identifier 36. The transformation from identification pattern features 40 to the item identifier 36 is based on one or more attributes or qualities of the features 41, e.g., location of features, size of features, color of features, etc. Predetermined transformation rules are followed to decode or convert the imaged identification pattern 41 to the item identifier 36.

A partial success in decoding the analog identification indicium 32 is indicated at step 490 by, for example, illuminating one but not both of the two authentication green LEDs 112, 114 and/or the sounding of a designated partial decode audio signal through a speaker 113, while the item identifier 36 is stored in the device's memory 124. After the indication of partial success in step 490, signifying the success acquisition of the item identifier 36 from the analog identification indicium 32, the reader 100, upon user activation, acquires another image in step 495.

In step 500, the device 100 attempts to find the 2D bar code 50 in the captured image. If it is not found as expected, it indicates a failure mode in step 510, for example by energizing a red LED 115 and/or the sounding of a designated failure audio signal through the speaker 113, and ends the session at step 515. If the device 100 does find the 2D bar code 50 in the captured image, at step 505, the device decoding software 110 decodes the digital identification record 34 and the digital signature 54 to determine the item identifier 38. The digital signature 54 is decoded to verify the authenticity of the digital identification record 34. The comparison software 118 then compares the two item identifiers 36, 38 to verify the authenticity of the product 12.

If the comparison at step 505 succeeds, that is, the item identifiers 36, 38 are substantially identical, the product 12 is deemed authentic and, at step 475, success is indicated to the operator via illuminating both LEDs 112, 114 and/or the sounding of a designated success audio signal through the speaker 113, and the process ends at step 515. On the other hand, if the comparison at step 505 fails, that is, the item identifiers 36, 38 are not substantially the same, failure is indicated in step 510 by illuminating red LED 115 and/or the sounding of a designated partial decode audio signal through the speaker 113 and the process ends at step 515.

If the authentication enabled 2D bar code 50 is found in the captured image at step 410, then at step 412, the device decoding software 110 decodes the digital identification record 34 to generate the item identifier 38. The digital signature 54 is also decoded and is used to authenticate the digital identification record 34. If the digital identification record 34 cannot be both decoded and verified, then failure is indicated in step 510 (via red LED 115 and/or audio tone) and the process ends at step 515.

If the digital identification record 34 is verified and decoded to generate the item identifier 38, then at step 418, the software searches for the outline 44 of the analog identification indicium 32 in the image. If the identification mark of the analog identification indicium 32 is not found, a partial success is indicated in step 430 (by illuminating one of the two green LEDs 112, 114 and/or sounding an audio tone) to signify the successful acquisition of the item identifier 38. Upon user activation of the device 100, another image is acquired in step 435. In step 440, the new image is searched for the outline 44 of the analog identification indicium 32. If this step fails, failure is indicated at step 510 (illuminate red LED 115) and the session ends at step 515.

If the analog identification outline 44 is found at step 440, control passes to step 450. If the analog identification outline 44 is found at step 418, then again control is passed to step 450. At step 450, an image containing the analog identification indicium 32 is acquired using the UV light source 122. The analog identification pattern 41 is decoded and the item identifier 36 is calculated in step 455. In step 460, the two item identifiers 36, 38 are compared by the comparison software 118 to verify the authenticity of the product 12.

If the verification based on the comparison of the two item identifiers 36, 38 fails, failure is indicated in 510 by illuminating the red LED 115 and/or sounding an audio tone for failure, and session ends at step 515. However, if the verification succeeds, success is indicated in 470 by illuminating both green LEDs 112, 114 and/or sounding an audio tone for successful authentication, and session again ends at step 515.

Those in the art can easily embellish FIG. 4 in accordance to industry standard practices regarding bar code readers. For example, from each user activation step to the point where the reader determines that a code has not been properly acquired in the image in memory, one or more images could be acquired and decode attempted before a failure is declared. On the other hand, if one of these images is decoded successfully, the session (or half-session) is declared successful (or partially successful).

In steps 460 and 505, the item identifiers 34, 36 are verified with a user selectable degree of tolerance or error. The predetermined tolerance or error level may include values for both the number of features found and for their specific values. For example, if the item identifiers 34, 36 represent the x-y coordinates of 25 features in the identification pattern 41, a level of tolerance may be set such that at least 23 of the 25 features need to be identified when imaging the pattern 41. This would account for dust or other contaminants covering or a scratch obliterating a particular feature. Further, with regard to the features identified, a level of tolerance may be set such that the coordinate values must be within +/−10% to be considered a match. For example, if the item identifier 38 included an x-y coordinate value of (205, 489), if the item identifier 36 included a coordinate value of (193, 510) would be considered a match since each of the x and y values are within +/−10%.

The digital identification record 34 is verified in 505 and 412 using the digital signature 54 and the manufacturer's public key. This key should be made available by the manufacturer. The key is usually obtained or verifiable through a trusted certificate agent. The key can be stored in the reader's memory 124 (FIG. 3) or on an associated computer that is accessed by wireless or hard-wired connection. Most readers have sufficient on board memory to cache a number of public keys.

Digital signatures are generally fixed for each manufacturer, with occasional changes in the event that it is retired due to special circumstances such as a merger or breach of security. It is thus generally safe to cache the key for a limited period of time. An expiration time is generally specified with the key, such as one year form the time of issuance or renewal.

The digital signature can be verified alone, without the reading of the analog identification indicium 32. This approach allows a degree of authentication to be provided without requiring hardware modifications for activating specialized features in the analog identification feature.

Alternative embodiments of the security device include using other digital media to record the same information that is recorded in the 2D bar code 50. For example, a magnetic device, or solid-state memory device (such as a memory button or a radio-frequency ID tag (RFID)) could be used.

It can be seen from the foregoing description, that including authentication features in a bar code can streamline the authentication process, make authentication features in labels difficult to copy or produce in counterfeit labels, and improve the detection of counterfeit goods. Although the invention has been described with a certain degree of particularity, it should be understood that various changes can be made by those skilled in the art without departing from the spirit or scope of the invention as hereinafter claimed.

We claim:

1. A method of identifying or authenticating a product comprising the steps of:
    providing an analog identification indicium comprising a randomized pattern of identification features within an area of interest on a first part of the product, one or more attributes of the randomized pattern of identification features corresponding to an item identifier;
    providing a digital identification record on a second part of the product, the digital identification record including an encoded digital version of the item identifier, the first and second parts being separable when the product is used;
    reading the randomized pattern of identification features of the analog identification indicium and decoding an item identifier;
    reading the digital identification record and decoding an item identifier; and
    determining authenticity of the product by comparing the item identifier determined from the analog identification indicium to the item identifier determined from the digital identification record.

2. The method of claim 1 wherein the identification features are particles that embedded in the first part of the product.

3. The method of claim 1 wherein the identification features are particles that are imprinted on the first part of the product.

4. The method of claim 1 wherein the identification features are readable only when illuminated with illumination of a predetermined wavelength.

5. The method of claim 1 wherein the one or more attributes of the identification features that correspond to the item identifier include the horizontal and vertical coordinates of each of the identification features with respect to a coordinate system.

6. The method of claim 1 wherein the digital identification record is a digital product identification signature encoded into a 2D bar code imprinted on the second part of the product.

7. The method of claim 1 wherein the product includes a container with a label, an opening of the container, and a tamper-resistant seal overlying the opening and wherein the analog identification indicium is embedded in one of the label and the tamper-resistant seal and further wherein the digital identification record is imprinted on the other of the label and the tamper-resistant seal.

8. The method of claim 1 further including the step of providing a signal indicating authenticity of the product if the product is found authentic.

9. The method of claim 1 wherein the step of determining authenticity of the product includes the substep of determining if the item identifier determined from the analog identification indicium substantially corresponds to the item identifier determined from the digital identification record.

10. The method of claim 1 wherein the analog identification indicium includes a plurality of identification features within a marked area of interest and the marked area includes an identification mark and an orientation mark, wherein the identification mark is visible under normal illumination.

11. A system for authenticating a product comprising:
the product including:
an analog identification indicium comprising a random pattern of identification features within an area of interest on a first part of the product, the analog identification indicium representing an item identifier; and
a digital identifier affixed to a second part of the product, the digital identifier including an encoded version of the item identifier; and
an imaging device including an imaging system for generating an image of the analog identification indicium and the digital identifier;
the imaging device further including circuitry for:
analyzing the image of the identification features and decoding an item identifier;
analyzing the image of the digital identifier and decoding an item identifier; and
comparing the item identifier determined from the analog identification indicium to the item identifier determined from the digital identifier to authenticate the product.

12. The system of claim 11 wherein the first and second parts of the product are separated when the product is used.

13. The system of claim 11 wherein the identification features are particles that are embedded in the first part of the product.

14. The system of claim 11 wherein the identification features are particles that are imprinted on the first part of the product.

15. The system of claim 11 wherein the identification features are readable only when illuminated with illumination of a predetermined wavelength.

16. The system of claim 11 wherein the one or more attributes of the identification features that correspond to the item identifier include the horizontal and vertical coordinates of each of the identification features with respect to a coordinate system, wherein the coordinate system is based on a border of the analog identification indicium.

17. The system of claim 11 wherein the digital identifier is a digital identification record encoded into a 2D bar code imprinted on the second part of the product.

18. The system of claim 11 wherein the product includes a container with a label, an opening of the container, and a tamper-resistant seal overlying the opening and wherein the analog identification indicium is embedded in one of the label and the tamper-resistant seal and further wherein the digital identification record is imprinted on the other of the label and the tamper-resistant seal.

19. The system of claim 11 further including the step of providing a signal indicating authenticity of the product if the product is found authentic.

20. The system of claim 11 wherein determining authenticity of the product includes determining if the item identifier determined from the analog identification indicia substantially corresponds to the item identifier determined from the digital identifier.

21. The system of claim 11 wherein the analog identification indicium includes a plurality of identification features within a marked area of interest and the marked area includes an identification mark and an orientation mark, wherein the identification mark is visible under normal illumination.

22. A method of identifying or authenticating a product comprising the steps of:
providing an analog identification indicium comprising a randomized pattern of identification features within an area of interest on a first part of the product, one or more attributes of the randomized pattern of identification features corresponding to an item identifier;
providing a digital identifier on a second part of the product, the digital identification record including an encoded digital version of the item identifier;
reading the randomized pattern of identification features of the analog identification indicium and decoding an item identifier;
reading the digital identifier and decoding an item identifier; and
determining authenticity of the product by comparing the item identifier determined from the analog identification indicium to the item identifier determined from the digital identifier.

23. The method of claim 22 wherein the first and second parts of the product are separable when the product is used.

24. The method of claim 22 wherein the digital identifier comprises a digital identification record encoded in a 2D bar code.

* * * * *